US010268075B2

(12) United States Patent
Yuki et al.

(10) Patent No.: US 10,268,075 B2
(45) Date of Patent: Apr. 23, 2019

(54) LIGHTING DEVICE AND DISPLAY DEVICE

(71) Applicant: Sharp Kabushiki Kaisha, Sakai, Osaka (JP)

(72) Inventors: Ryuzo Yuki, Sakai (JP); Hisashi Watanabe, Sakai (JP); Shinya Kadowaki, Sakai (JP); Mitsuhiro Murata, Sakai (JP); Takeshi Ishida, Sakai (JP); Takeshi Masuda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/539,642

(22) PCT Filed: Dec. 18, 2015

(86) PCT No.: PCT/JP2015/085482
§ 371 (c)(1),
(2) Date: Jun. 23, 2017

(87) PCT Pub. No.: WO2016/104360
PCT Pub. Date: Jun. 30, 2016

(65) Prior Publication Data
US 2017/0359867 A1    Dec. 14, 2017

(30) Foreign Application Priority Data
Dec. 26, 2014    (JP) .................... 2014-265561

(51) Int. Cl.
*G02F 1/1335*    (2006.01)
*H05B 33/08*    (2006.01)
(Continued)

(52) U.S. Cl.
CPC ........ *G02F 1/133615* (2013.01); *F21V 19/00* (2013.01); *F21V 23/04* (2013.01);
(Continued)

(58) Field of Classification Search
CPC ............ H05B 33/086; G02F 1/133604; G02F 1/1336; G02F 2001/133607;
(Continued)

(56) References Cited

U.S. PATENT DOCUMENTS

2002/0130985 A1* 9/2002 Weindorf ............ G02B 6/0068
349/61
2011/0050682 A1* 3/2011 Lin ........................ G09G 3/342
345/214
(Continued)

FOREIGN PATENT DOCUMENTS

| JP | 2009-199971 A | 9/2009 | |
|----|---------------|--------|---|
| JP | 2009199971 A * | 9/2009 | |
| JP | 2014154321 A * | 8/2014 | G02B 6/0053 |

OTHER PUBLICATIONS

English translation of JP 2009199971 A, Title: Lighting Device, Author: Hatano, Takayuki; Hirokawa, Takuo; Date of publication: Sep. 3, 2009.*
(Continued)

*Primary Examiner* — Shan Liu
(74) *Attorney, Agent, or Firm* — ScienBiziP, P.C.

(57) ABSTRACT

A lighting device includes light sources, a light source board, and a casing. The light source board includes a board body portion having a substantially circular outer edge where the light sources are arranged at intervals in a substantially annular shape such that each light source emits light toward a center, an extended portion extending inward from the board body portion, and a trace portion electrically connected to each light source. The casing includes a tubular-shaped side wall portion surrounding the light sources, and a bottom portion disposed opposite the board body portion and having an exit hole therethrough through
(Continued)

which the extended portion is inserted and the distal end of the extended portion is extended outside.

8 Claims, 15 Drawing Sheets

(51) Int. Cl.
*F21V 19/00* (2006.01)
*F21V 23/04* (2006.01)

(52) U.S. Cl.
CPC ..... *G02F 1/133604* (2013.01); *H05B 33/086* (2013.01); *G02F 2201/56* (2013.01)

(58) Field of Classification Search
CPC ... G02F 2001/133616; G02F 1/133606; G02F 1/133504; G02F 1/133615; G02F 1/0121; G02F 1/0327; G02F 1/076; G02F 1/133; G02F 1/13306; G02F 1/1345; G02F 1/13452; G02F 1/13454; G02F 1/13458; G02F 2001/133388; G02F 2001/133612; G02F 2001/13546; G02F 1/133308; G02F 1/133608; G02F 2001/133311; G02F 2001/133314; G02F 2001/133317; G02F 2001/13332; G02F 2001/133322; G02F 2001/133325; G02F 2001/133328; G02F 2001/133331; G02F 2001/133334; F21V 19/00; F21V 23/04; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 6/0088; G09G 2300/0426; G09G 2300/0408; G09G 3/3655; G09G 3/3674; G09G 3/3685; G09G 2290/00; G09G 2320/0223; G09G 2300/0421; G09G 3/36; H01L 23/48; H01L 23/49572; H01L 2224/50; H01L 2224/79; H01L 2224/86; H01L 2225/06579; H01L 2225/107; H01L 24/50
USPC .......... 349/61–64, 65, 149–152, 58, 59, 60
See application file for complete search history.

(56) References Cited

U.S. PATENT DOCUMENTS

| | | | |
|---|---|---|---|
| 2011/0102726 A1* | 5/2011 | Nobeoka | G02F 1/13306 349/150 |
| 2011/0134364 A1* | 6/2011 | Neyama | G02F 1/133308 349/62 |
| 2011/0134371 A1* | 6/2011 | Shimojoh | G02B 6/0083 349/65 |
| 2013/0141667 A1* | 6/2013 | Son | G02B 6/0083 349/62 |
| 2014/0168566 A1* | 6/2014 | Cho | G02F 1/133615 349/58 |
| 2016/0116146 A1* | 4/2016 | Van Winkle | F21V 3/0625 362/311.02 |

OTHER PUBLICATIONS

English translation of JP 2014154321 A, Title: Illumination Device, Author: Kotani Naoki, Tanimura Ichiro, Nakagawa Yuuji, Kadoriku Shinji, Murase Ryuma, Fukui Koji; Date of publication: Sep. 25, 2014.*

* cited by examiner

LIGHTING DEVICE AND DISPLAY DEVICE

TECHNICAL FIELD

The present invention relates to a lighting device and a display device.

BACKGROUND ART

Display devices using a liquid crystal panel as a display part displaying images have been known. The liquid crystal panel does not emit light and such display devices include a lighting device (a backlight device) for lighting the liquid crystal panel from a rear surface side thereof.

Recently, such display devices including a circular liquid crystal panel have been known as is described in Patent Document 1.

Conventional display devices generally include a rectangular liquid crystal panel. In a conventional liquid crystal panel, a driving circuit such as a gate driver is arranged in a frame-shaped non-display area outside a display area. The gate drivers can be arranged dispersedly in pixels within the display area and the non-display area can be very thin with the recent technology. Accordingly, the shape of the liquid crystal panel can be varied freely and circular liquid crystal panels as described above may be used.

As described in Patent Document 1, the circular liquid crystal panel is configured to display images with using light exiting the circular lighting device. The circular lighting device include a circular light guide plate, LEDs that are arranged at intervals along periphery of (surrounding) the light guide plate, and a casing where the light guide plate and the LEDs are arranged. Each of the LEDs is mounted on a board having a predetermined trace pattern thereon and arranged in the casing.

The circular lighting device includes the LEDs that are arranged opposite a peripheral edge surface of the light guide plate. The peripheral edge surface that is opposite each LED is a light entrance portion where light from the LEDs enters. The light entering the light guide plate exits the light guide plate through a front-side plate surface facing the liquid crystal panel.

RELATED ART DOCUMENT

Patent Document

Patent Document 1: Japanese Unexamined Patent Application Publication No. 2009-199971

Problem to be Solved by the Invention

The traces that are to be electrically connected to an external power source are generally mounted on the board where the LEDs are mounted. Such traces extend outside through an exit hole that is a through hole formed in a wall of the casing.

Light from the light source may leak outside the casing through the exit hole that is formed in a certain part of the casing (such as a side wall of the casing), although it is not described in Patent Document 1. If the light leaks outside the casing, the amount of rays of light exiting the light guide plate through the light exit portion is insufficient in a portion near the exit hole, and a dark portion (luminance unevenness) may be caused in the light exiting the light guide plate.

DISCLOSURE OF THE PRESENT INVENTION

The technology disclosed herein was made in view of the above circumstances. An object is to provide a lighting device in which dark portions are less likely to be caused in exit light.

Means for Solving the Problem

A lighting device according to the present technology includes light sources, a light source board, and a casing. The light source board includes a board body portion having a substantially circular outer edge and on which the light sources are arranged at intervals in a substantially annular shape such that each of the light sources emits light toward a center, an extended portion extending inward from the board body portion, and a trace portion electrically connected to each of the light sources for supplying power to each of the light sources and disposed in an area from the board body portion to the extended portion such that an end of the trace portion is arranged at a distal end of the extended portion. The casing includes a side wall portion having a tubular shape and surrounding the light sources that are arranged in the substantially annular shape, and a bottom portion disposed on one end of the side wall portion to be opposite the board body portion and having an exit hole therethrough through which the extended portion is inserted and the distal end of the extended portion is outside.

In the lighting device having the above configuration, a dark portion that is caused by leaking some of the rays of exit light through the exit hole to the outside is less likely to be caused.

In the lighting device, the board body portion may have a substantially annular shape.

In the lighting device, the board body portion may include a mounting portion having a substantially annular shape and a cover portion covering inside of the mounting portion.

In the lighting device, the cover portion may have a hole surrounding a periphery of the extended portion so as not to be in contact with the extended portion.

In the lighting device, the board body portion and the extended portion may be formed integrally with each other.

In the lighting device, the light source board may be a flexible printed circuit board.

In the lighting device, the extended portion may include multiple extended portions.

In the lighting device, the extended portion may extend from a portion of the board body portion between adjacent light sources and having no light source thereon. According to such a configuration, the extended portion is less likely to block the exit light from the light source.

In the lighting device, the board body portion may have a mounting surface on which the light sources are arranged and an opposite surface that is opposite of the mounting surface, and the opposite surface may be opposite the bottom portion.

In the lighting device, the board body portion may have a mounting surface on which the light sources are arranged and an opposite surface that is opposite of the mounting surface, and the opposite surface may be opposite the bottom portion, and the lighting device may further include a reflection sheet disposed on a mounting surface side of the board body portion to cover the mounting portion and the cover portion. According to such a configuration, the reflection sheet is supported by the mounting portion and the cover portion such that the warping of the reflection sheet is less likely to be caused.

The lighting device may further include a light guide plate having a substantially circular plan view shape and arranged inside the light sources that are arranged in the substantially annular shape.

A display device according to the present technology includes the above lighting device and a display panel.

Advantageous Effect of the Invention

According to the technology disclosed in this specification, a lighting device in which a dark portion is less likely to be caused in exit light is provided.

MODES FOR CARRYING OUT THE INVENTION

First Embodiment

A first embodiment will be described with reference to FIGS. 1 to 6. A configuration of a liquid crystal display device (a display device) 10 including a liquid crystal panel 11 as a display panel (a display portion) will be described. A vertical direction in FIGS. 1 and 2 is a reference vertical direction of the liquid crystal panel 11 and an upper side and a lower side in FIGS. 1 and 2 are a front side and a rear side, respectively.

Figure 1:
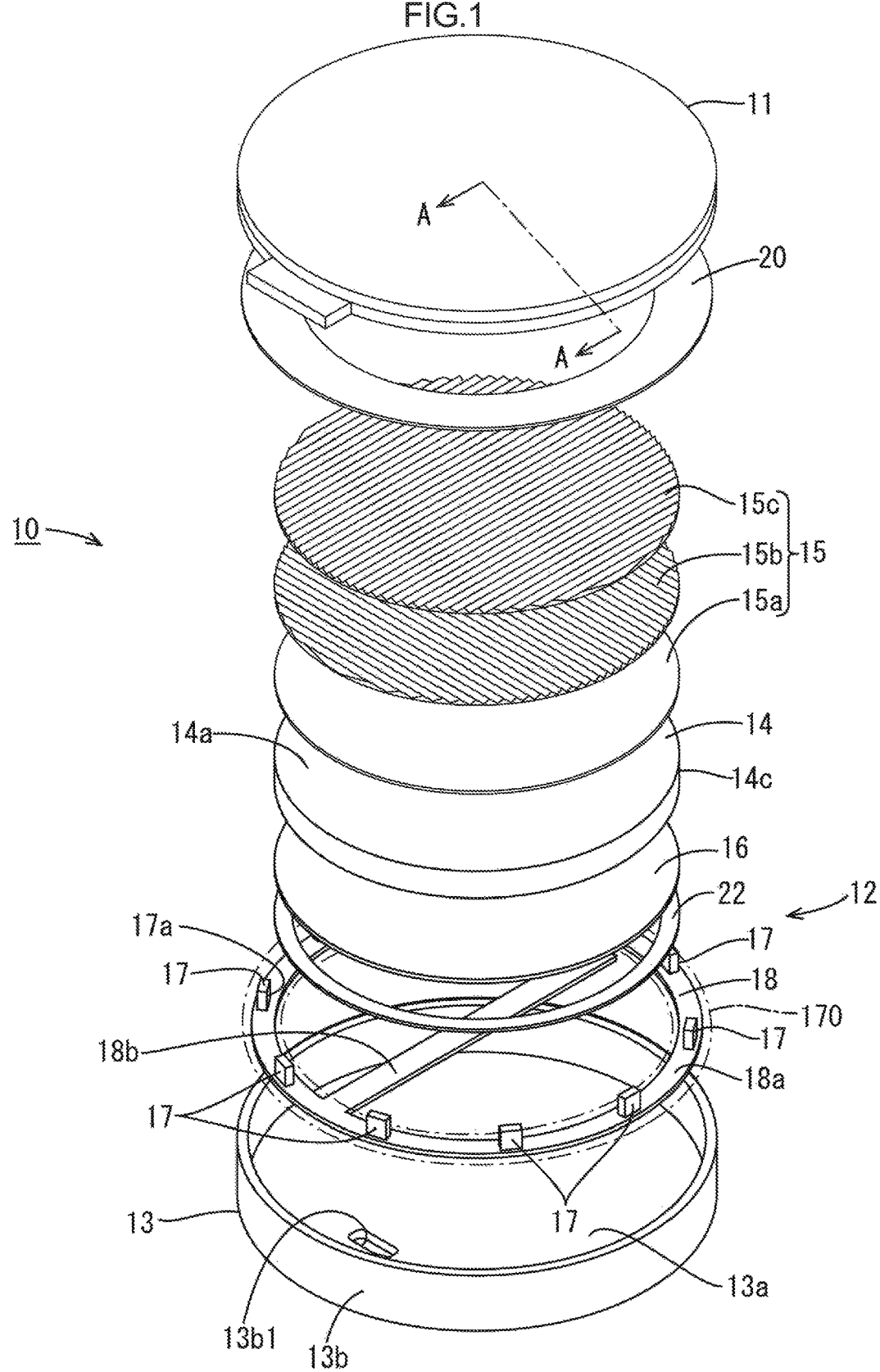
FIG. 1 is an exploded perspective view illustrating a liquid crystal display device according to a first embodiment.
Figure 2:
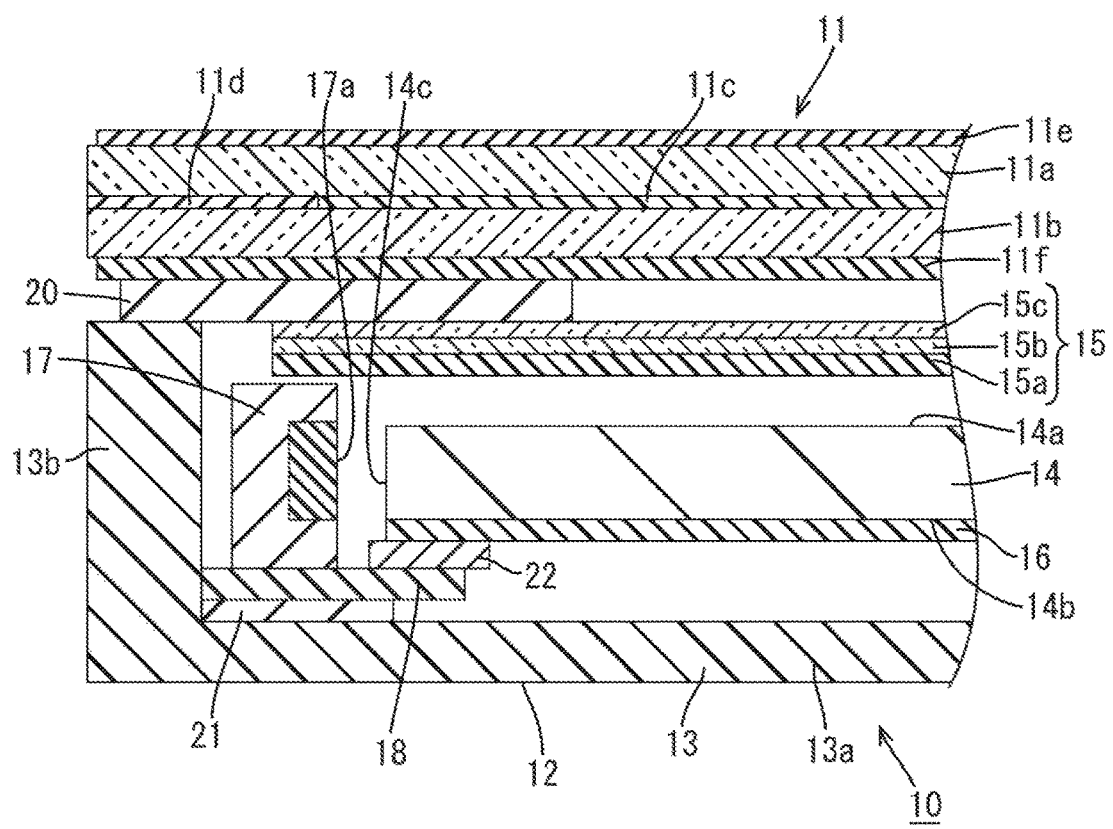
FIG. 2 is a cross-sectional view of the liquid crystal display device of FIG. 1.

FIG. 1 is an exploded perspective view illustrating the liquid crystal display device 10 according to the first embodiment and FIG. 2 is a cross-sectional view of the liquid crystal display device taken along line A-A in FIG. 1. As illustrated in FIG. 1, the liquid crystal display device 10 has a substantially circular shape as a whole. The liquid crystal display device 10 at least includes a liquid crystal panel (a display panel) 11 for displaying images thereon, and a backlight device (a lighting device) 12 arranged on a rear side with respect to the liquid crystal panel 11 and providing light toward the liquid crystal panel 11. The liquid crystal display device 10 may include a bezel (not illustrated) and the bezel and the backlight device 12 may hold an outer peripheral edge portion of the liquid crystal panel 11.

The liquid crystal display device 10 according to the present embodiment is preferably used in electronic devices (not illustrated) such as mobile phones (including smart phones), laptop computers (including tablet-type laptop computers), mobile information terminals (including an electronic book and PDA), a digital photo frame, portable video game players, a car navigation system, and an instrumental panel. However, the liquid crystal display device 10 may be used in other devices. The display size of the liquid crystal panel 11 included in the liquid crystal display device 10 is from several inches to a dozen inches. Namely, the liquid crystal panel 11 is generally classified as a small sized or a medium sized panel. However, the display size is not limited thereto.

The liquid crystal panel 11 will be described. The liquid crystal panel 11 has a substantially circular plan view shape as a whole. The liquid crystal panel 11 mainly includes a pair of transparent glass substrates 11a, 11b having a substantially circular plan view shape and a liquid crystal layer 11c in between the substrates 11a and 11b. The substrates 11a, 11b are bonded together with a sealing agent 11d having a bonding force with a gap therebetween. The gap corresponds to a thickness of the liquid crystal layer 11c.

The liquid crystal panel 11 includes a display area (an active area) that is substantially circular and in a middle portion of a display screen and a non-display area (a non-active area) that is substantially annular and outside the display area. The non-display area is substantially annular and on an outer peripheral side of the display screen and surrounds the display area. Images appear on the display area and no images appear on the non-display area. Light provided by the backlight device 12 enters the liquid crystal panel 11 from the rear surface side thereof and exits the liquid crystal panel 11 from the front surface side. Accordingly, images are displayed in the display area of the liquid crystal panel 11. Polarizing plates 11e, 11f are bonded to outer surfaces of the substrates 11a, 11b, respectively. The liquid crystal panel 11 of the present embodiment is operated in a fringe field switching (FFS) mode.

One of the substrates 11a, 11b on the front (a front-surface side) is a color filter substrate (a CF substrate) 11a and the other one of the substrates 11a, 11b on the rear (a rear-surface side) is an array substrate 11b. A part of the outer peripheral edge portion of the array substrate 11b extends outward from an outer peripheral edge portion of the CF substrate 11a, and terminals (not illustrated) are arranged on the extended portion. The terminals are connected to terminals of a flexible printed circuit board (not illustrated) for supplying various signals to the array substrate 11b.

The array board 11b includes a glass support substrate and a large number of thin film transistors (TFTs) and a large number of pixel electrodes that are arranged in a matrix on an inner surface (a surface facing the liquid crystal layer 11c) of the glass support substrate. Source lines and gate lines are arranged around the TFTs on the array substrate 11b. A gate driver is mounted on the support substrate. Common electrodes opposing the pixel electrodes are arranged on the array substrate 11b. The pixel electrodes and the common electrodes are made of transparent conductive film including transparent and conductive materials such as indium tin oxide (ITO) or zinc oxide (ZnO). Oxide semiconductor is included in an active layer of the TFTs.

The CF substrate 11a includes a glass support substrate and a color filter arranged on an inner surface side (a liquid crystal layer 11c side) of the support substrate. The color filter includes color sections of red (R), green (G), and blue (B) that are arranged in a matrix. A light blocking layer (a black matrix) is arranged between the color sections of the color filter.

Alignment films (not illustrated) are provided on an inner surface side of the substrates 11a, 11b, respectively, to align the liquid crystal molecules in the liquid crystal layer 11c.

Next, the backlight device 12 will be described. The backlight device 12 has a substantially circular plan view shape as a whole similar to the liquid crystal panel 11. As illustrated in FIGS. 1 and 2, the backlight device 12 mainly includes a chassis (a casing) 13, a light guide plate 14, optical sheets 15, a reflection sheet 16, light emitting diodes (LEDs) 17 that are light sources, and a LED board (a light source board) 18 where the LEDs 17 are mounted.

The chassis 13 has a substantially circular plan view shape similarly to the liquid crystal panel 11, and has a shallow box shape as a whole to be open toward the front surface side. The chassis 13 may be a molded product made of synthetic resin. The LED board 18, the reflection sheet 16, the light guide plate 14, and the optical sheets 15 are arranged in a space within the molded product.

The chassis 13 includes a bottom portion 13a having a substantially circular plan view shape and a side wall portion 13b having a substantially tubular shape and extending from an outer peripheral edge portion of the bottom portion 13a toward the front surface side. The bottom portion 13a is a plate having a certain thickness. The reflection sheet 16, the light guide plate 14, and the optical sheets 15 are layered on the bottom portion 13a in this order. The side wall portion 13b is a plate having a certain thickness and has a substantially tubular shape (a ring shape) that surrounds the LEDs 17 from outside. The LEDs 17 are arranged in an annular (a ring) shape around the light guide plate 14.

The chassis 13 has an exit hole 13a1 that is through the thickness of the bottom portion 13a and an extended portion 18b of the LED board 18, which will be described later, is inserted through the exit hole 13a1 to the outside of the chassis 13.

A panel fixing tape 20 is bonded on a distal end portion of the side wall portion 13b facing the front side and the liquid crystal panel 11 is fixed to the backlight device 12. The panel fixing tape 20 is a double-sided adhesive tape having a light blocking property and has a substantially circular ring shape with a plan view. The panel fixing tape 20 has adhesive surfaces on a rear surface and a front surface thereof. The rear side adhesive surface is adhered on a portion ranging from a distal end of the side wall portion 13b to an outer peripheral edge portion of the optical sheets 15 on the front side. The front side adhesive surface is adhered on an outer peripheral edge portion of the liquid crystal panel 11 on the rear side.

Each LED (light source) 17 includes an LED chip (an LED component) that is a semiconductor light emitting component. The LED chip is arranged on a board that is fixed on a plate surface (a mounting surface 180) of the LED board 18 and sealed with resin and the LED emits white light. The LED chip that emits light in a single color of blue is used. The resin that seals the LED chip contains phosphors dispersed therein. The phosphors emit light in a predetermined color (for example, yellow, green, red) when excited by blue light emitted from the LED chip. The LED 17 has an outer appearance shape of a rectangular parallelepiped.

The LED 17 of the present embodiment is a side-surface-emitting type LED. The LED 17 has a mounting surface (a mounting surface of the LED 17) that is mounted on the LED board 18 and a side surface that is adjacent to the mounting surface and the side surface is a light emission surface 17a. The LED 17 emits light having an optical axis that is parallel to a normal line to the light emission surface 17a. The optical axis is referred to as a traveling direction of rays of light having greatest light emission intensity among the rays of light emitted by the LED 17 and having a certain light distribution.

Multiple LEDs 17 are included and are arranged at intervals in an annular shape. The LEDs 17 that are arranged in the annular shape may be referred to as an annular arranged light source group 170. Each of the LEDs 17 included in the annular arranged light source group 170 is arranged such that the light emission surface (a light exit surface) 17a faces a center of the annular arranged light source group 170 and each LED 17 emits light from the light emission surface (the light exit surface) 17a toward the center.

Figure 3:
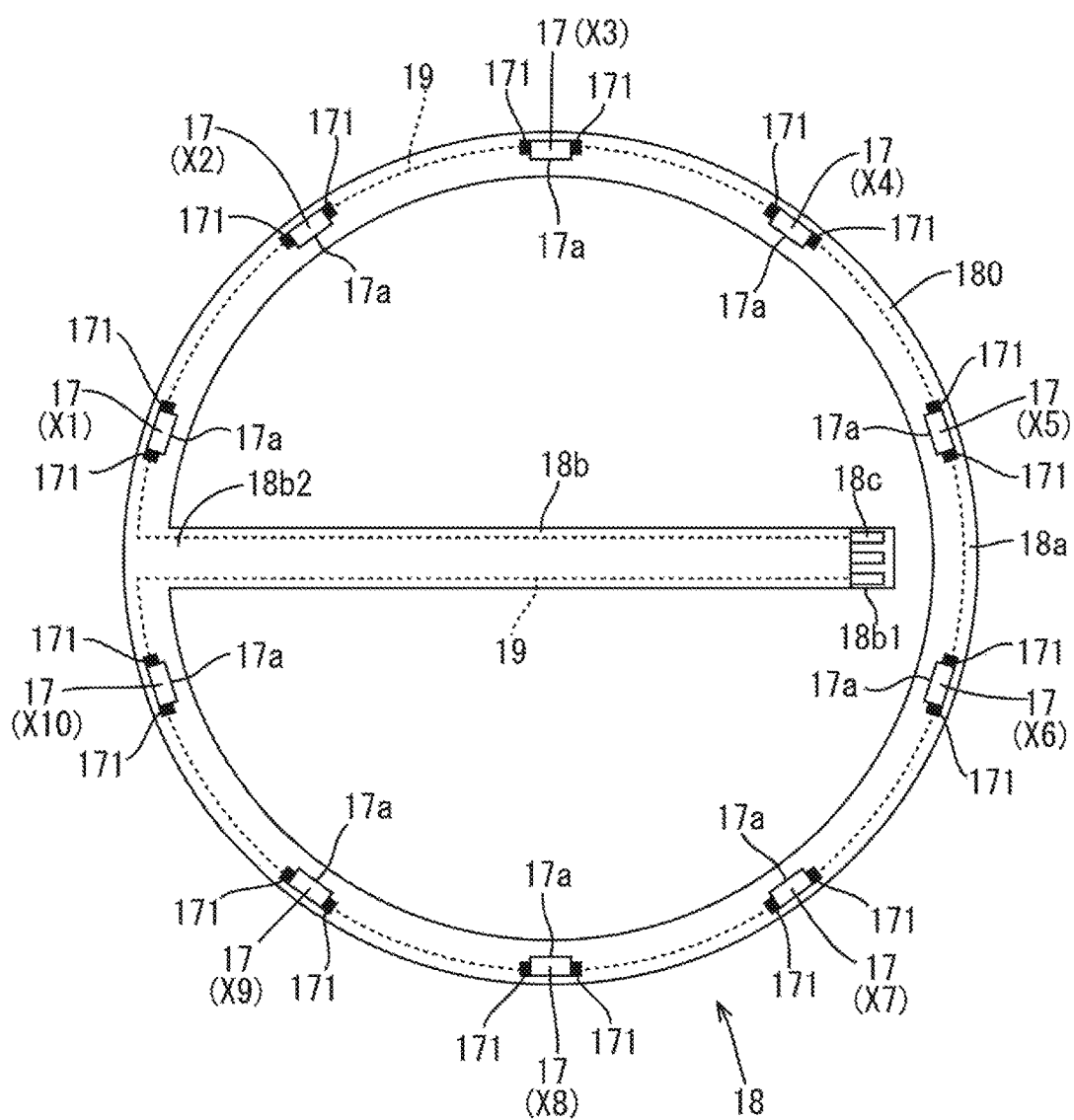
FIG. 3 is a plan view of a LED board.
Figure 4:
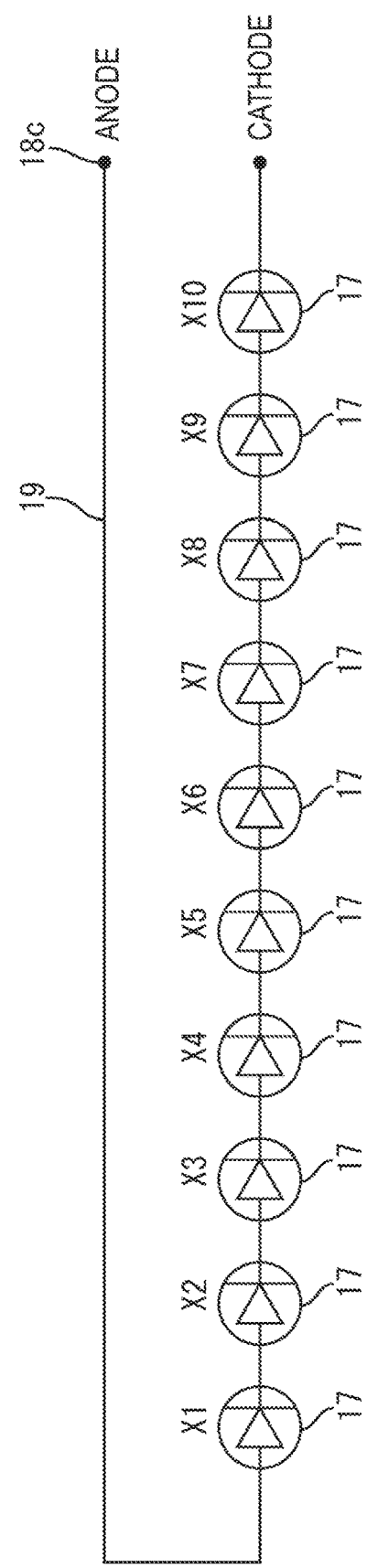
FIG. 4 is a typical circuit diagram of the LED board 18.

The LED board (the light source board) 18 is a base board film (sheet) and has a substantially annular plan view shape as a whole. FIG. 3 is a plan view of the LED board 18 and FIG. 4 is a typical circuit diagram of the LED board 18. The LED board 18 of the present embodiment is a flexible printed circuit board and has flexibility.

The LED board 18 mainly includes a support layer, a trace pattern (a trace portion) 19, and an insulation film. The support layer is mainly made of insulation material such as polyimide resin. The trace pattern 19 is formed on the support layer and made of copper foil for supplying power to each LED 17. The insulation film is disposed on the support layer to cover the trace pattern 19.

The LED board 18 includes a board body portion 18a and an extended portion 18b.

The LEDs 17 are mounted on the board body portion 18a and the board body portion 18a has a substantially annular plan view shape. The LEDs 17 are arranged at intervals in an annular shape such that each LED 17 emits light toward a center (a center of the annular arranged light source group 170). Namely, the LEDs 17 are mounted on the board body portion 18a such that the light emission surface 17a of each LED 17 faces the center of the annular arranged light source group 170.

The board body portion 18a has an outer edge having a substantially circular shape. The outer edge of the board body portion 18a extends along an inner edge of the tubular side wall portion 13b within the chassis 13. An inner edge of the board body portion 18a extends along the outer peripheral edge of the light guide plate 14 that has a substantially circular plan view shape.

The extended portion 18b is a belt-like shaped portion that extends inward (toward the center) from the inner edge of the annular board body portion 18a and has flexibility. The extended portion 18b includes terminal portions 18c at a distal end 18b1 thereof and the terminal portions 18c are disposed at an end of the trace pattern 19. The terminal portions 18c are disposed at the distal end 18b1 of the extended portion 18b so as to be exposed outside. The extended portion 18b has a basal portion 18b2 that is integrally connected to the board body portion 18a and the board body portion 18a and the extended portion 18b are continuous to each other.

The extended portion 18b is arranged on an inner edge side of a portion of the board body portion 18a where no LED 17 is mounted. The extended portion 18b is not opposite a front surface of the LED 17.

The trace pattern 19 extends in an area from the board body portion 18 to the extended portion 18b such that the trace pattern 19 is electrically connected to each of the LEDs 17 mounted on the board body portion 18a and the end of the trace pattern 19 is located at the distal end 18b1 of the extended portion 18b.

Each of the LEDs 17 mounted on the board body portion 18a includes terminals 171 on two edges thereof and the terminals 171 are connected to the trace pattern 19. As illustrated in FIGS. 3 and 4, the LEDs 17 are electrically connected in series via the trace pattern 19.

In FIG. 3, mounting positions of the LEDs 17 on the LED board 18 (the board body portion 18a) are indicated by X1 to X10. In the present embodiment, the LED 17 close to the basal portion 18b2 of the extended portion 18b is arranged in a mounting position X1 and the mounting positions X1 to X10 of the LEDs 17 are defined sequentially in a clockwise direction starting from the position X1. Each of the intervals between adjacent LEDs 17 is constant (equal).

The LEDs 17 are arranged opposite each other with having the center of the annular board body portion 18a (a center of the annular arranged light source group 170) therebetween such that one LED 17 is opposite another LED 17 on an opposite side with respect to the center.

Figure 5:
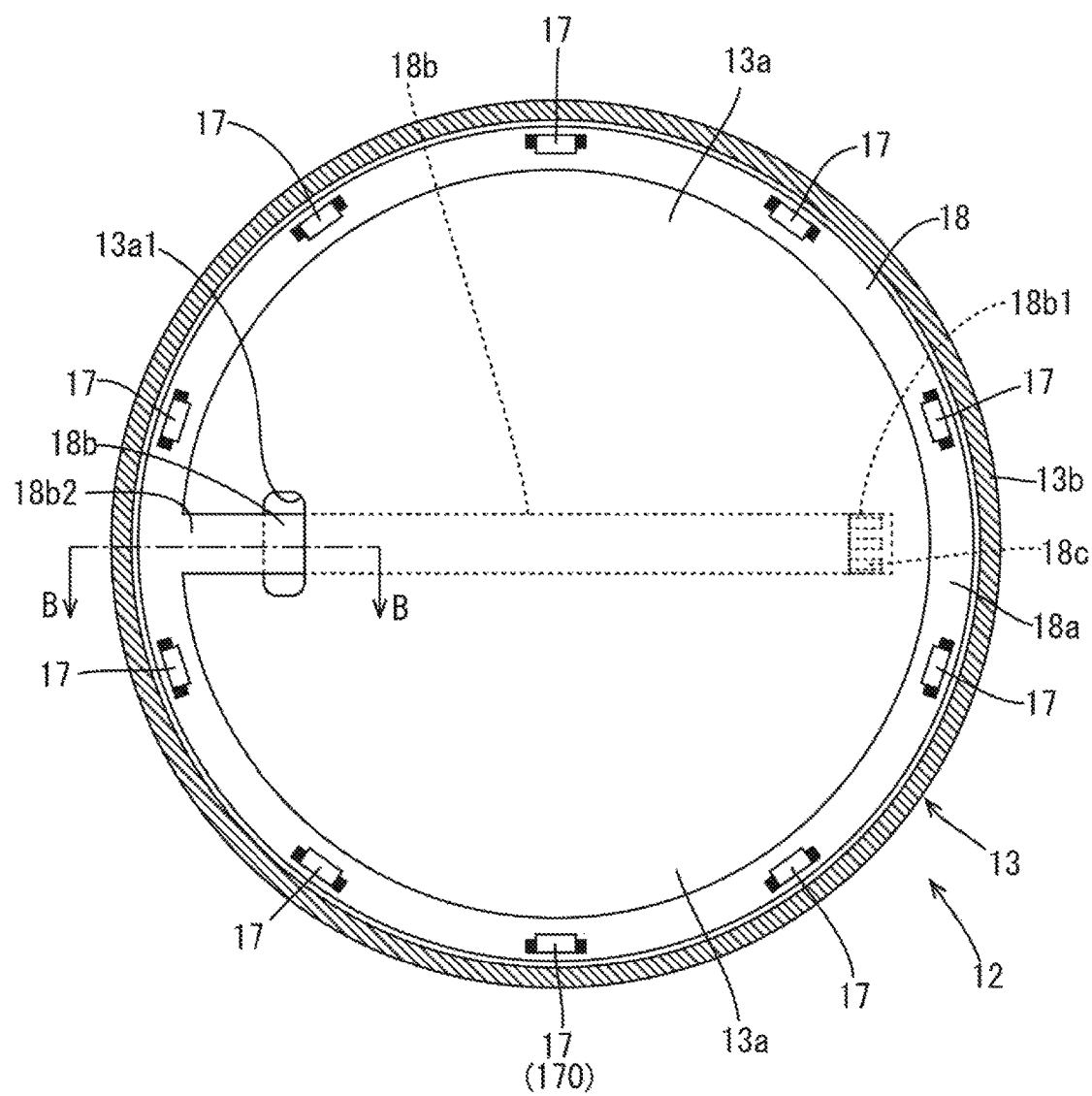
FIG. 5 is a plan view illustrating the LED board that is arranged in a chassis.
Figure 6:
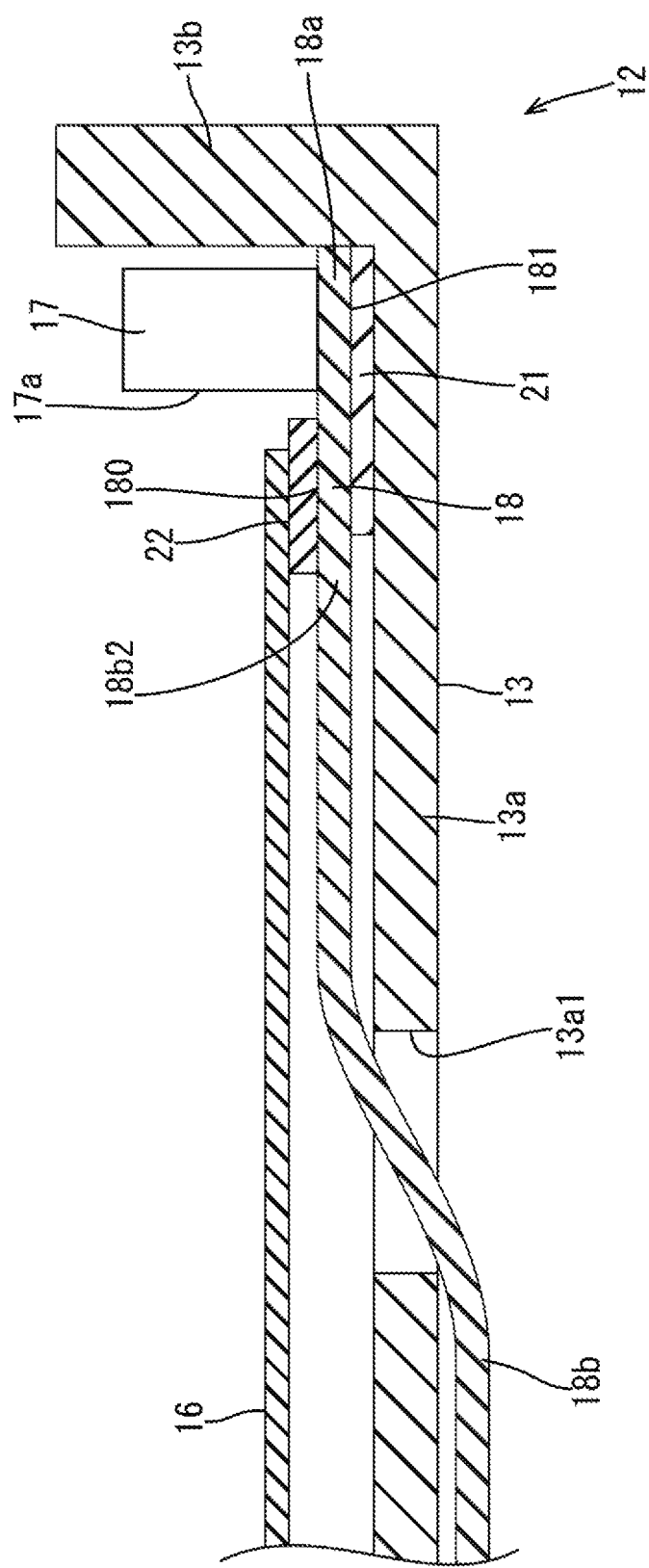
FIG. 6 is a cross-sectional view taken along line B-B in FIG. 5.

FIG. 5 is a plan view illustrating the LED board 18 that is arranged in the chassis 13 and FIG. 6 is a cross-sectional view taken along line B-B in FIG. 5. A reflection sheet 16 is illustrated in FIG. 6. The LED board 18 is arranged in the chassis 13 such that the mounting surface 180 and an opposite surface 181 of the board body portion 18a are substantially parallel to a plate surface of the bottom portion 13a. In this state, the mounting surface 180 of the LED board 18 faces the front side and the opposite surface 181 that is on an opposite side from the mounting surface 180 is opposite the bottom portion 13a.

The LED board 18 is bonded on the bottom portion 13a of the chassis 13 with using a board fixing tape 21 bonded on the opposite surface 181 side of the annular board body portion 18a. The board fixing tape 21 is a double-sided adhesive tape and has a substantially annular shape along the shape of the board body portion 18a. The board fixing tape 21 is bonded on the bottom portion 13a along the outer peripheral edge of the bottom portion 13a.

In the present embodiment, the outer edge portion of the reflection sheet 16 overlaps the inner peripheral edge portion of the board body portion 18a within the chassis 13. Namely, a rear surface of the outer edge portion of the reflection sheet 16 is opposite a front surface of the inner peripheral edge portion of the board body portion 18a. A sheet fixing tape 22 that is a light blocking double-sided adhesive tape is between the inner peripheral edge portion of the board body portion 18a and the outer peripheral edge portion of the reflection sheet 16 and the reflection sheet 16 is fixed on the board body portion 18a with the sheet fixing tape 22.

The extended portion 18b is inserted through the exit hole 13a1 that is through the bottom portion 13a of the chassis 13 from the distal end 18b1 side and extends from the inside to the outside of the chassis 13 (the rear side of the chassis 13) through the exit hole 13a1. The extended portion 18b includes the terminal portions 18c at the distal end 18b1 thereof and the terminal portions 18c are to be connected to a power supply connector of an LED drive circuit board (not illustrated) that is mounted on the rear side of the bottom portion 13a. The LEDs 17 on the LED board 18 are supplied with power from the LED drive circuit board (not illustrated) through the trace pattern (the trace portion) 19.

The exit hole 13a1 is formed in a portion of the bottom portion 13a of the chassis 13 that is inside with respect to the LEDs 17 (inside with respect to the annular arranged light source group 170) with a plan view and in the portion of the bottom portion 13a overlapping the extended portion 18b. The exit hole 13a1 is preferably formed in the portion that is covered with the reflection sheet 16.

The extended portion 18b that is outside the chassis 13 through the exit hole 13a1 may extend straight or may be folded or curved, if necessary.

The light guide plate 14 has a substantially circular plan view shape similarly to the bottom portion 13a of the chassis 13. The light guide plate 14 is arranged in the chassis 13 and surrounded by the tubular side wall portion 13b. The optical sheets 15 and the liquid crystal panel 11 are disposed on the front side of the light guide plate 14 in this order.

The light guide plate 14 and the annular arranged light source group 170 are concentric within the chassis 13 and the light guide plate 14 is arranged inside the annular arranged light source group 170 including the LEDs 17 that are arranged in an annular pattern. Ideally, a center of the light guide plate 14 is on (overlapped with) a center of the annular arranged light source group 170 with a plan view.

The light guide plate 14 has an outer peripheral edge surface 14c including portions that are opposite the respective LEDs 17, and the portions of the peripheral edge surface 14c are light entrance portions 14c1 through which light from the LEDs 17 directly enters the light guide plate 14.

The light guide plate 14 has a front-side plate surface that is a light exit portion 14a through which the light entering the light guide plate 14 through the light entrance portions 14c1 exits the light guide plate toward the liquid crystal panel 11 (and toward the optical sheets 15). The light guide plate 14 has a rear-side plate surface (hereinafter, a rear surface) 14b that faces the bottom portion 13a of the chassis 13 and is covered with the reflection sheet 16.

The light emitted by each LED 17 enters the light guide plate 14 through each light entrance portion 14c1 (the outer peripheral edge surface 14c) and the light entering the light guide plate 14 travels within the light guide plate 14 and is directed toward the front side and exits the light guide plate 14 to the outside through the light exit portion 14a. The light exiting the light guide plate 14 to the outside passes through the optical sheets 15 and is supplied to the liquid crystal panel 11.

Some of the rays of light entering the light guide plate 14 may exit the light guide plate 14 to the outside through the outer peripheral edge surface 14c. However, such rays of light are reflected by the inner peripheral surface of the side wall portion 13b of the chassis 13 and enter the light guide plate 14 through the outer peripheral edge surface 14c again.

The light guide plate 14 includes a light reflecting pattern (not illustrated) as a light reflecting portion on the rear surface 14b. The light reflecting portion reflects light travelling within the light guide plate 14 toward the front side to accelerate the light to exit through the light exit portion 14a. The light reflecting portion may be a light reflecting coating material such as white ink or three-dimensional light reflecting obstacles such as an emboss pattern. The light reflecting pattern includes micro dots as the light reflecting portion. As the density of the light reflecting portion in the light reflecting pattern (a distribution density) is higher, the light reflecting ability of the light reflecting pattern increases.

The density of the light reflecting portion is highest near the portions of the outer peripheral edge surface 14c that are not opposite the LEDs 17 and is lowest near the light entrance portions 14c1 that are opposite the LEDs 17 with respect to the circumferential direction of the light guide plate 14. The density of the light reflecting portion is increased as is closer to the center from the outer peripheral edge surface 14c with respect to the radial direction of the light guide plate 14. As the light guide plate 14 has such a light reflecting pattern on the rear surface 14b thereof, uniformity (evenness of luminance) of light exiting through the light exit portion 14a is improved.

The optical sheets 15 include multiple sheets that forma layered component and are disposed on the front side surface of the light guide plate 14 to cover the light exit portion 14a. The light exiting the light guide plate 14 transmits through the optical sheets 15 with the optical characteristics of the light being changed. The optical sheets 15 include a diffuser sheet 15a and two lens sheets 15b, 15c. In another embodiment, a reflection type polarizing sheet may be further included. The optical sheets 15 have a substantially circular plan-view shape similarly to the light guide plate 14. The optical sheets 15 are slightly larger than the light guide plate 14.

The reflection sheet 16 has a substantially circular plan-view shape similarly to the light guide plate 14 and is between the bottom wall portion 13a of the chassis 13 and the light guide plate 14. The reflection sheet 16 may be a sheet base member made of white synthetic resin having a highly light reflective surface (for example, a white foamed polyethylene terephthalate sheet). The reflection sheet 16 has a size that can cover an entire area of the rear surface 14b of the light guide plate 14. The reflection sheet 16 is fixed on the board body portion 18a of the LED board 18 at the edge portion thereof with the sheet fixing tape 22.

The light exiting the light guide plate 14 through the rear surface 14b to the outside is reflected by the reflection sheet 16 and returned into the light guide plate 14 and travels toward the front side. As illustrated in FIG. 6, the exit hole 13a1 of the bottom portion 13a is covered with the reflection sheet 16. Therefore, the light emitted from the light emission surfaces 17a of the LEDs 17 and the light exiting the light guide plate 14 through the rear surface 14b to the outside of the light guide plate 14 is not directed toward the exit hole 13a1 but supplied toward the light guide plate 14.

In such a backlight device 12, a penetrating direction of the exit hole 13a1 is not same as a direction in which the light emitted by the LEDs 17 travels and spreads within the light guide plate 14 (namely, a planar direction of the light guide plate 14 including optical axes of light from the LEDs 17). The exit hole 13a1 is on an opposite side from the light exit portion 14a (on the rear surface 14b side) with respect to the light guide plate 14. The penetrating direction of the exit hole 13a1 is vertical to the direction in which the light emitted by the LEDs 17 travels and spreads within the light guide plate 14.

In the present embodiment, the reflection sheet 16 is arranged to cover the exit hole 13a1 within the chassis 13.

Accordingly, in the backlight device 12 of the present embodiment, the light emitted by the LEDs 17 or the light exiting the light guide plate 14 to the outside thereof are less likely to leak outside through the exit hole 13b1 through which the extended portion 18b extends outside the chassis 13. Therefore, the amount of light exiting the backlight device 12 is less likely to be insufficient in a portion near the exit hole 13b1 and a dark portion is less likely to be caused near the exit hole 13b1.

When the extended portion 18b is inserted through the exit hole 13b1 to the outside of the bottom portion 13a, the board body portion 18a may be pulled inward (to the inner edge portion thereof) with the extended portion 18b and the board body portion 18a may be locally applied with a force. Accordingly, the LED 17 mounted on the board body portion 18a may be moved closer to the outer peripheral edge surface 17c of the light guide plate 14. The light entrance efficiency of the light emitted by the LED 17 entering through the outer peripheral edge surface 14c (the light entrance portion 14c1) is less likely to be lowered even if the LED 17 is moved closer to the outer peripheral edge surface 17c of the light guide plate 14. A flexible printed circuit board having flexibility may be used as the LED board 18 that is less likely to lower the light entrance efficiency that may be lowered by pulling of the extended portion 18b toward the distal end 18b1.

Comparative Example

Figure 7:
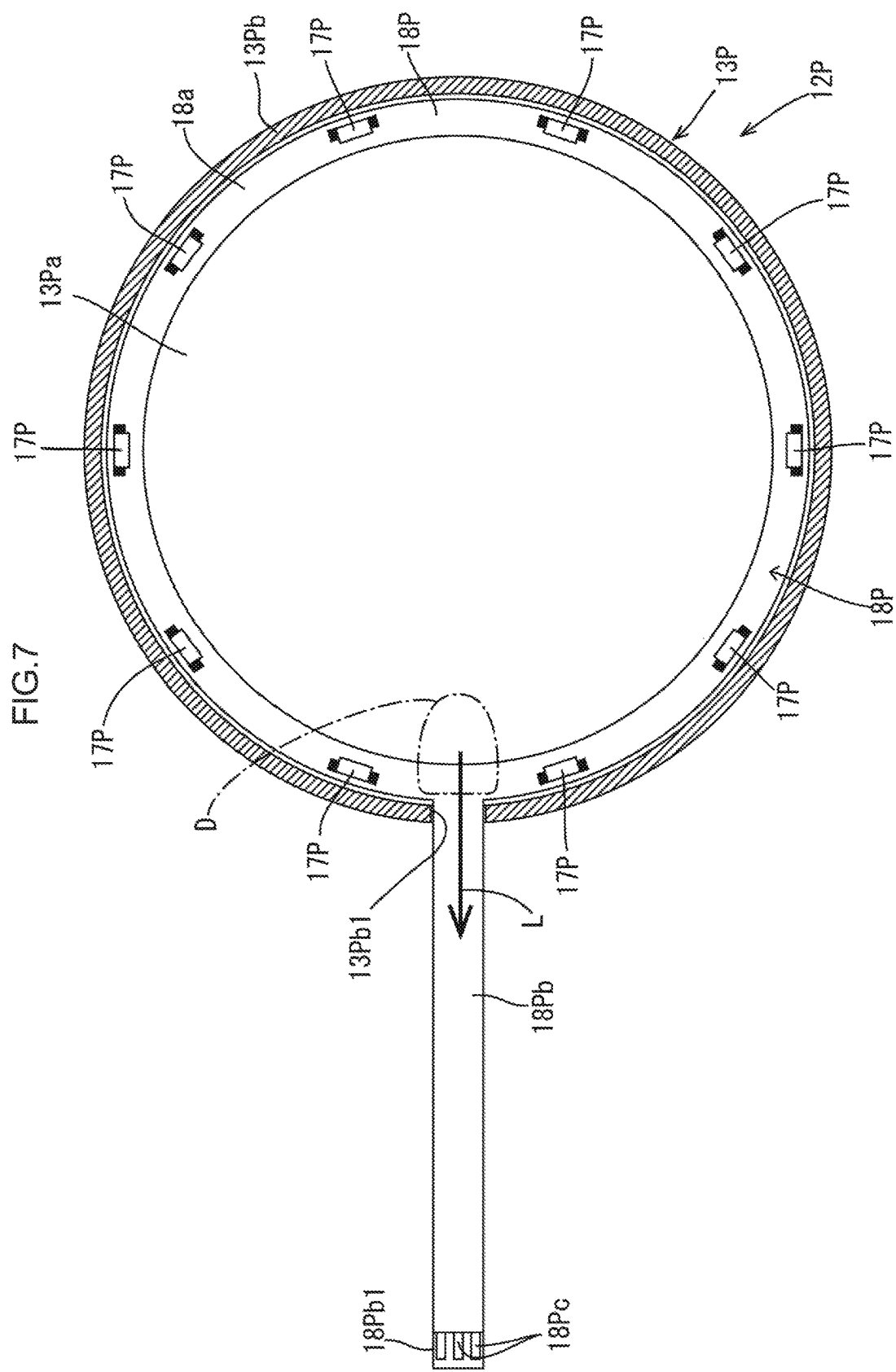
FIG. 7 is a plan view of a backlight device used in a liquid crystal display device according to a comparative example.

A comparative example of the present embodiment will be described with reference to FIG. 7. FIG. 7 is a plan view of a backlight device 12P used in a liquid crystal display device of the comparative example. FIG. 7 illustrates a plan view of a LED board 18P that is arranged in a chassis 13P according to the comparative example. A light guide plate and other components are not described in FIG. 7 for simplifying the description of the comparative example.

The chassis 13P of the comparative example has a basic configuration same as that of the chassis 13 of the first embodiment and includes a bottom portion 13Pa having a substantially circular plan view shape and a tubular-shaped side wall portion 13Pb extending upward from an outer peripheral edge of the bottom portion 13Pa. The chassis 13P of the comparative example has an exit hole 13Pb1 in a part of the tubular side wall portion 13Pb by cutting off a part of the tubular side wall portion 13Pb (to penetrate through the side wall portion 13Pb in the thickness direction thereof). An extended portion 18Pb of the LED board 18P extends through the exit hole 13Pb1 to the outside. The LED board 18P of the comparative example includes a substantially annular-shaped board body portion 18Pa on which LEDs 17P are mounted similar to the first embodiment and includes an outer extended portion 18Pb that extends outside the outer edge of the board body portion 18Pa unlike the first embodiment. On the LED board 18P of the comparative example, a trace pattern (not illustrated) is formed in an area from the board body portion 18Pa to the outer extended portion 18Pb and end portions of the trace pattern is connected to terminal portions 18Pc mounted on a distal end portion 18Pb1 of the outer extended portion 18Pb. As illustrated in FIG. 7, the outer extended portion 18Pb extends from the inside of the chassis 13P to the outside of the chassis 13P through the exit hole 13Pb1 of the side wall 13Pb. Other configuration of the backlight device 12P of the comparative example is same as that of the first embodiment.

In such a backlight device 12P of the comparative example, some of the rays of light emitted by the LEDs 17P travels within the light guide plate toward the exit hole 13Pb1 and finally exits the light guide plate through the outer peripheral edge surface and leak outside the chassis 13P through the exit hole 13Pb1. If the light leaks outside through the exit hole 13Pb1 (as is illustrated by an arrow L in FIG. 7), among the rays of the light exiting the backlight device 12P, the amount of light exiting the portion near the exit hole 13Pb1 is insufficient and a dark portion (luminance unevenness) is caused near the exit hole 13Pb1. A position of a dark portion D that may be caused near the exit hole 13Pb1 is typically illustrated in FIG. 7.

In the backlight device 12P of the comparative example, if the extended portion 18Pb is pulled to the outside of the side wall portion 13Pb, a force is locally applied to the board body portion 18Pa such that the board body portion 18Pa is pulled toward the outer edge side via the extended portion 18Pb. Accordingly, the LEDs 17P mounted on the board body portion 18Pa may be moved to be away from the outer peripheral edge surface of the light guide plate, and the light entrance efficiency of light from the LEDs 17P entering through the outer peripheral edge surface (the light entrance portion) may be lowered.

Next, backlight devices of other embodiments of the present invention will be described. In the following description of other embodiments, similar configurations to the first embodiment are provided with same symbols or numerals and will not be described. Configurations that are not similar to those of the first embodiment but correspond to those of the first embodiment are provided with symbols or numerals including the symbols or the numerals of the first embodiment and respective symbols for each embodiment (for example, in a second embodiment).

Second Embodiment

Figure 8:
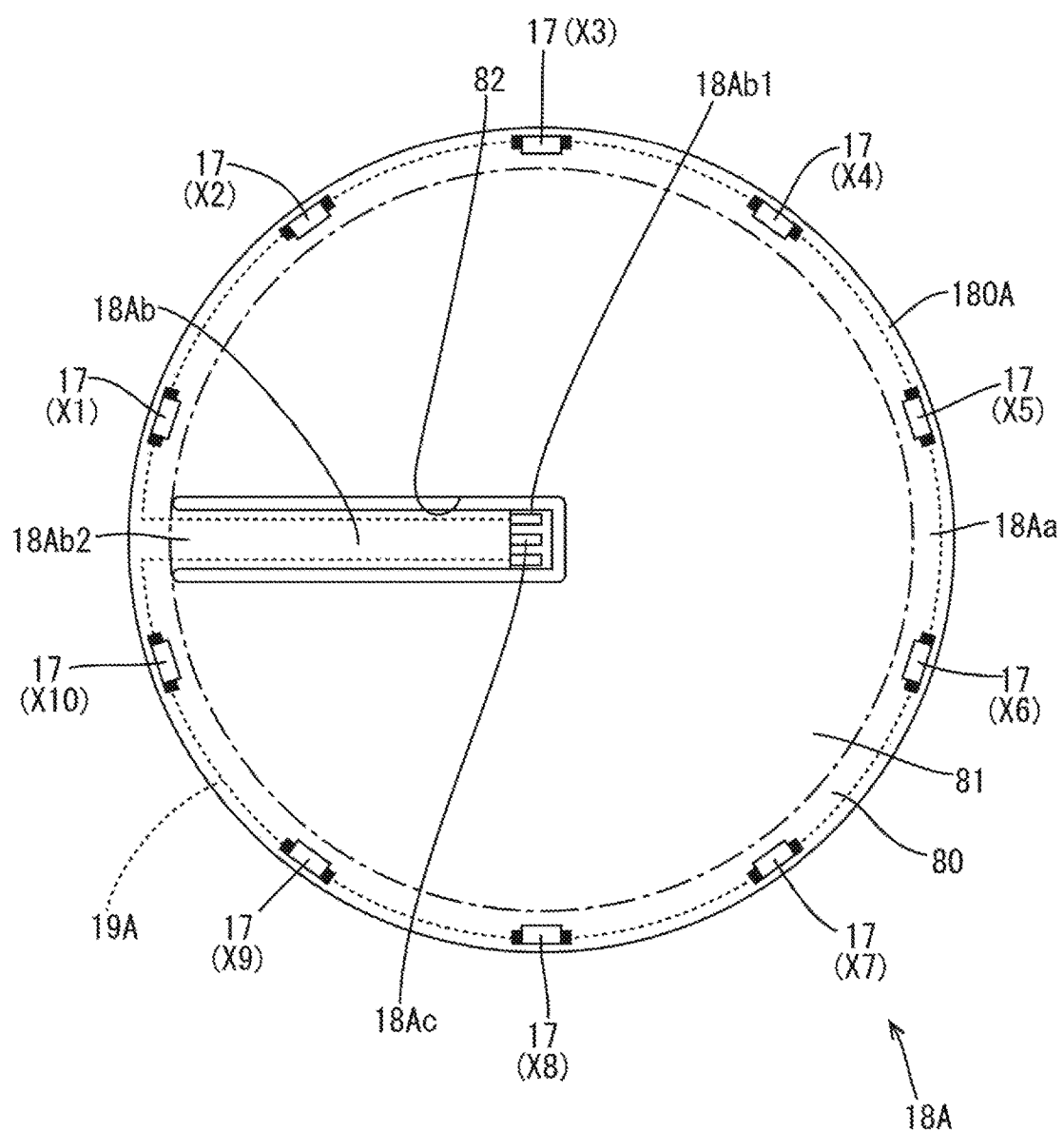
FIG. 8 is a plan view of a LED board that is used in a backlight device according to a second embodiment.
Figure 9:
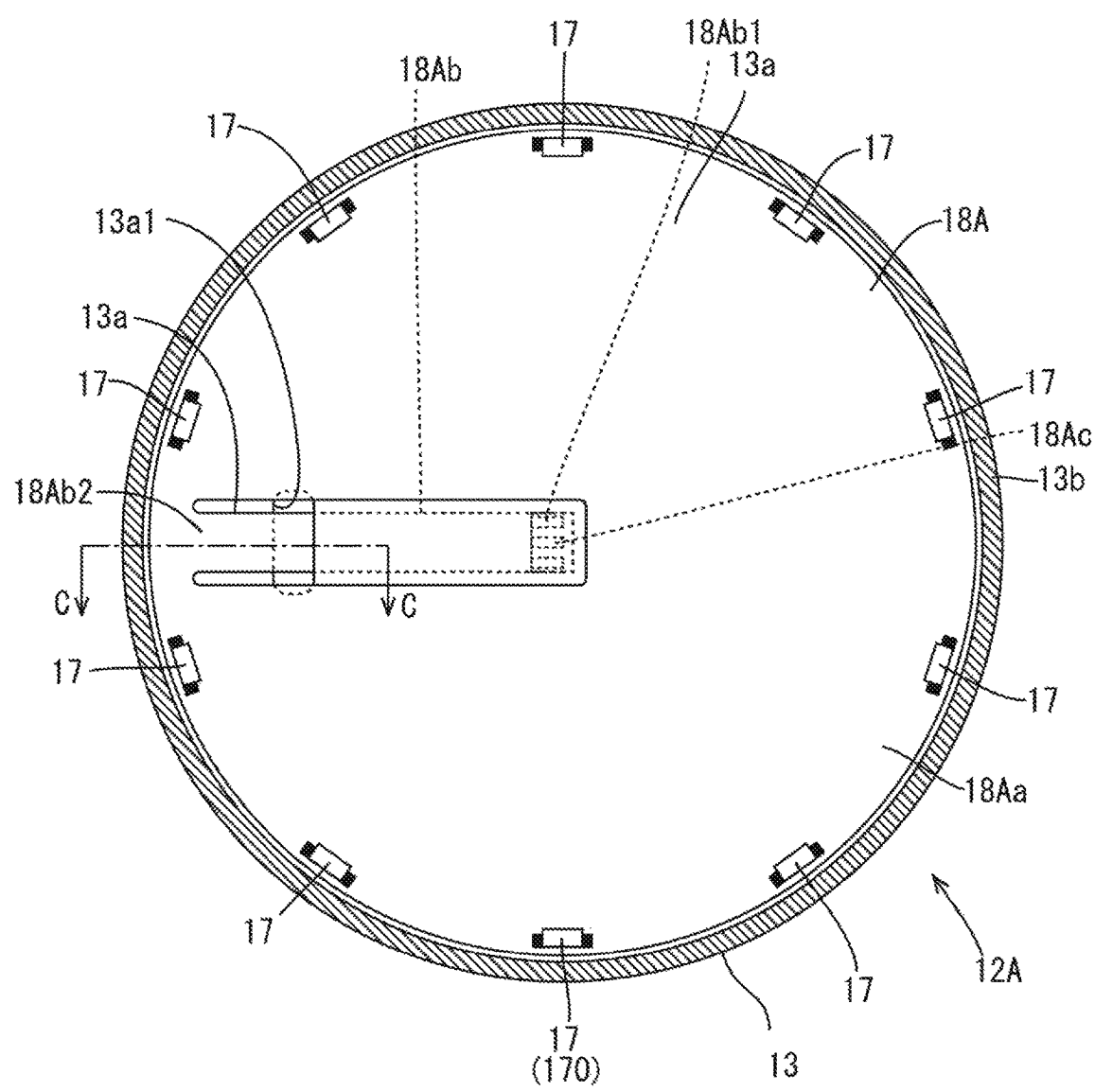
FIG. 9 is a plan view of the backlight device of the second embodiment.
Figure 10:
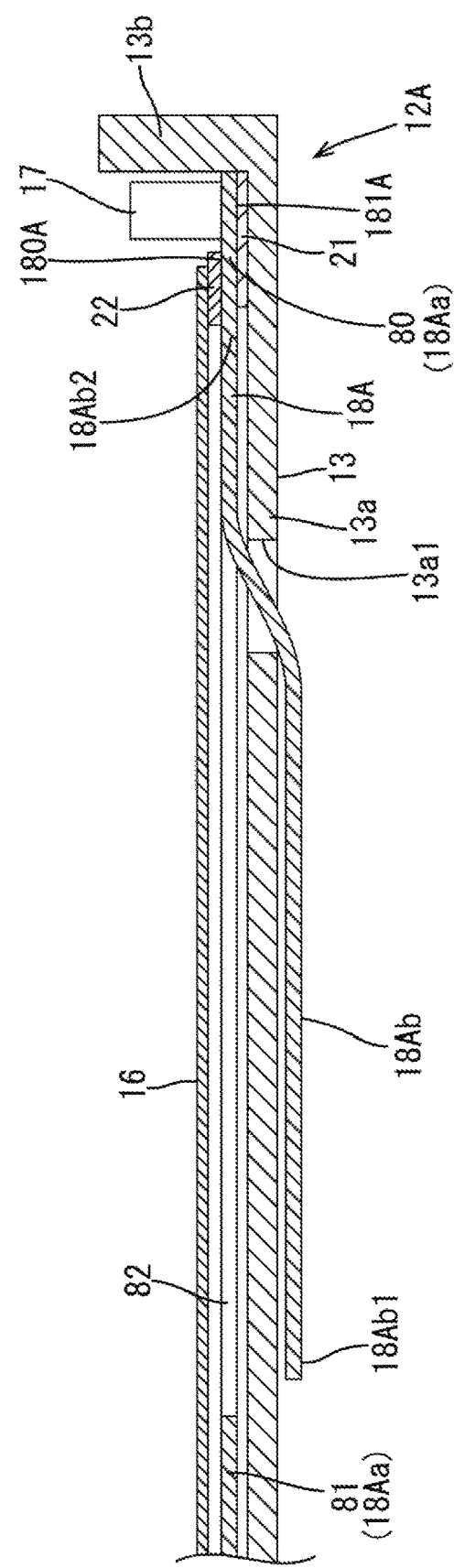
FIG. 10 is a cross-sectional view taken along line C-C in FIG. 9.

FIG. 8 is a plan view of a LED board 18A that is used in a backlight device 12A according to a second embodiment, FIG. 9 is a plan view of the backlight device 12A of the second embodiment, and FIG. 10 is a cross-sectional view taken along line C-C in FIG. 9. The backlight device 12A of the present embodiment includes the LED board 18A instead of the LED board 18 of the first embodiment.

The LED board 18A includes a board body portion 18Aa having a substantially circular (disk-like shape) plan view shape, and a belt-like extended portion 18Ab extending inwardly (toward a center of the board body portion 18Aa) from the board body portion 18A.

The board body portion 18Aa has a substantially circular outer edge with a plan view. The board body portion 18Aa includes an annular mounting portion 80 and a cover portion 81. The annular mounting portion 80 is on an outer edge portion side of the board body portion 18Aa and LEDs 17 are mounted on the annular mounting portion 80. The cover portion 81 is arranged to partially cover an imaginary hole (space) within the annular mounting portion 80.

The LEDs 17 are arranged in a ring at intervals therebetween on the mounting portion 80 so as to emit light toward a center (a center of the annular arranged light source group 170). The mounting portion 80 has a substantially circular outer edge.

The extended portion 18Ab extends inwardly (toward the center) from an inner edge of the substantially annular mounting portion 80 of the board body portion 18Aa and has a belt-like shape and flexibility. The cover portion 81 of the board body portion 18Aa has a hole 82 where the extended portion 18Ab fits such that the cover portion 18 is not contacted with the extended portion 18Ab. The hole 82 has an opening edge that is along an outer edge shape of the extended portion 18Ab and surrounds the extended portion 18Ab from a side except for a basal portion 18Ab2 side.

A trace pattern (the trace portion) 19A for supplying power to each of the LEDs 17 is arranged in an area from the mounting portion 80 to the extended portion 81Ab of the board body portion 18Aa. An end of the trace pattern 19A is at a distal end 18Ab1 of the extended portion 18Ab and a terminal portion 18Ac is arranged on the distal end 18Ab1 to be connected to the end of the trace pattern 19A. The basal portion 18Ab2 of the extended portion 18Ab is integrally connected to the mounting portion 80 of the board body portion 18Aa and the mounting portion 80 and the extended portion 18Ab of the board body portion 18Aa are continuously to each other. The LEDs 17 are electrically connected in series by the trace pattern 19A similarly to the first embodiment.

FIG. 9 is a plan view of the LED board 18A of the second embodiment that is arranged in the chassis 13. The mounting portion 80 of the board body portion 18Aa has a mounting surface 180A and an opposite surface 181A and the LED board 18A is arranged in the chassis 13 such that the mounting surface 180A and the opposite surface 181A are substantially parallel to the plate surface of the bottom portion 13a. In this state, the mounting surface 180A of the LED board 18A faces the front side and the opposite surface 181A that is opposite of the mounting surface 180A is opposite the bottom portion 13a of the chassis 13.

The LED board 18A is bonded on the bottom portion 13a of the chassis 13 with using the board fixing tape 21 bonded on the opposite surface 181A side of the annular mounting portion 80. The board fixing tape 21 is a double-sided adhesive tape and has a substantially annular shape along the shape of the mounting portion 80 of the board body portion 18Aa. The board fixing tape 21 is bonded on the bottom portion 13a along the outer peripheral edge of the bottom portion 13a.

The reflection sheet 16 is arranged to overlap the LED board 18A from the front side (see FIG. 10).

In the present embodiment, the outer edge portion of the reflection sheet 16 overlaps the inner peripheral edge portion of the mounting portion 80 in the chassis 13. Namely, a rear surface of the outer edge portion of the reflection sheet 16 is on a front surface of the inner peripheral edge portion of the mounting portion 80. The cover portion 81 and the hole 82 of the LED board 18A are entirely covered with the reflection sheet 16.

The sheet fixing tape 22 that is a light blocking double-sided adhesive tape is between the mounting portion 80 and the outer peripheral edge portion of the reflection sheet 16 and the reflection sheet 16 is fixed on the board body portion 18Aa with the sheet fixing tape 22.

The extended portion 18Ab is inserted through the exit hole 13a1 that is through the bottom portion 13a of the chassis 13 from the distal end 18b1 side and extends from the inside to the outside of the chassis 13 (the rear side of the chassis 13) through the exit hole 13a1, similarly to the first embodiment. The extended portion 18Ab includes the terminal portions 18Ac at the distal end 18Ab1 thereof and the terminal portions 18Ac are to be connected to a power supply connector of an LED drive circuit board (not illustrated) that is mounted on the rear side of the bottom portion 13a. The LEDs 17 on the LED board 18A are supplied with power from the LED drive circuit board (not illustrated) through the trace pattern (the trace portion) 19A.

The exit hole 13a1 is formed in a portion of the bottom portion 13a of the chassis 13 that is inside with respect to the LEDs 17 (inside with respect to the annular arranged light source group 170) with a plan view and in the portion of the bottom portion 13a overlapping the extended portion 18Ab, similarly to the first embodiment.

In the backlight device 12A of the present embodiment, following technical effects are obtained further to the technical effects obtained in the first embodiment.

In the backlight device 12A, as described before, the reflection sheet 16 is supported by the mounting portion 80 and the cover portion 81 of the LED board 18A from the rear side within the chassis 13. Therefore, the reflection sheet 16 is less likely to be warped in a middle portion thereof toward the bottom portion 13a of the chassis 13. Thus, in the present embodiment, luminance unevenness is less likely to be caused by the warping of the reflection sheet 16 in the exit light from the backlight device 12A.

Third Embodiment

Figure 11:
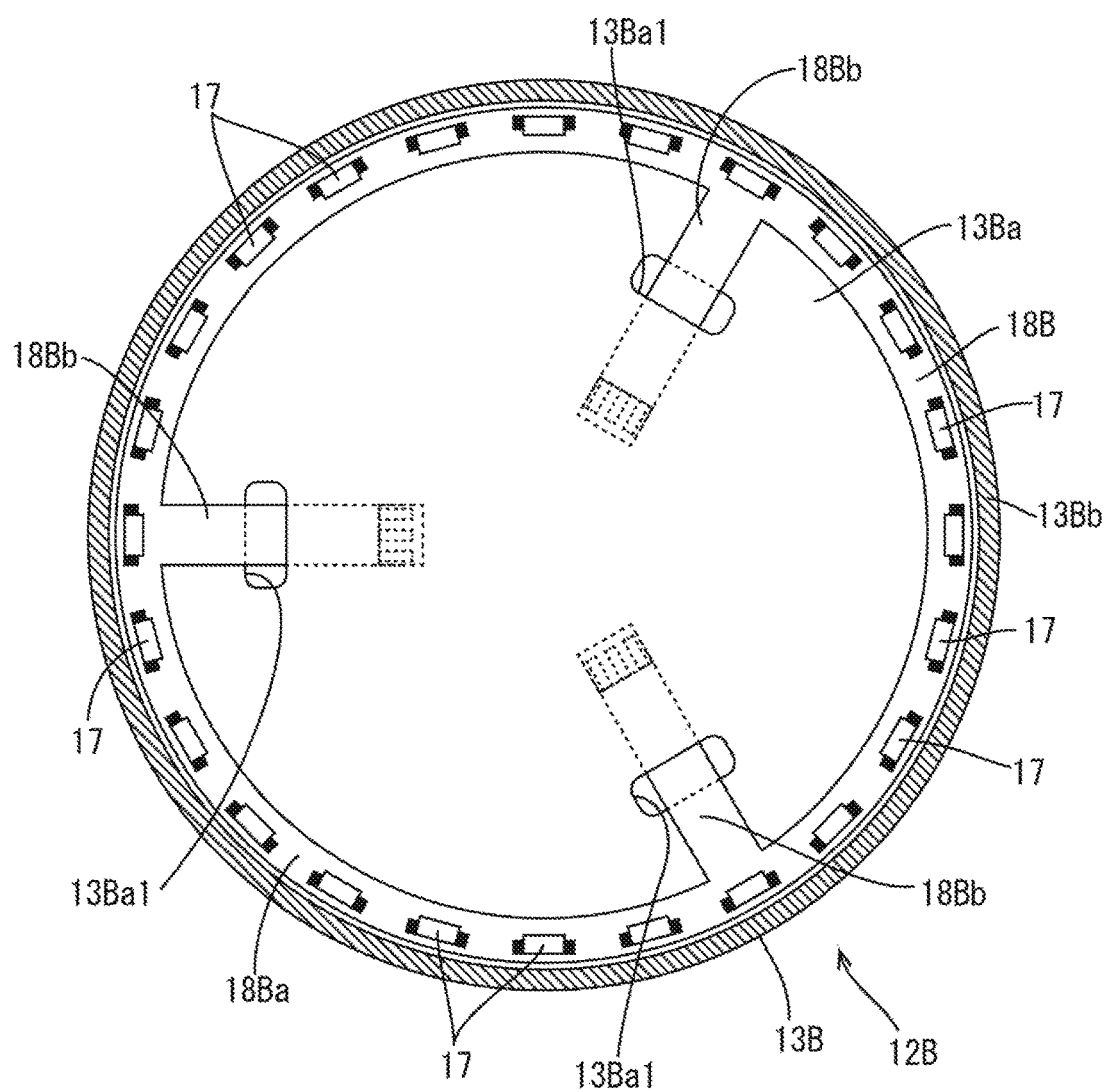
FIG. 11 is a plan view of a backlight device according to a third embodiment.

Next, a backlight device 12B according to a third embodiment of the present invention will be described with reference to FIG. 11. FIG. 11 is a plan view of a backlight device 12B of the third embodiment. The backlight device 12B of the present embodiment includes a LED board 18B including multiple (three) extended portions 18Bb.

The LED board 18B includes a substantially annular board body portion 18Ba with a plan view and three extended portions 18Bb that extend inwardly from an inner edge of the board body portion 18Ba and have a belt-like shape. The extended portions 18Bb are arranged at an equal interval in a circumferential direction of the board body portion 18Ba.

The LEDs 17 are arranged in a ring-shape on the board body portion 18Ba. A trace pattern (not illustrated) for supplying power to each of the LEDs 17 is formed in an area from the board body portion 19Ba to each of the extended portions 18Bb.

A chassis 13B in which the LED board 18B is arranged includes a bottom portion 13Ba having a substantially circular plan view shape and a side wall portion 13Bb having a substantially tubular shape and extending from an outer peripheral edge portion of the bottom portion 13Ba toward the front surface side, similarly to the first embodiment. The bottom portion 13Ba has three exit holes 13Ba1 that are through the thickness of the bottom portion 13Ba and the respective extended portions 18Bb is inserted from the inside to the outside of the chassis 13 through the respective exit holes 13Ba1.

Other configurations of the backlight device 12B are substantially same as those of the first embodiment.

As is in the present embodiment, the LED board 18B may include multiple extended portions to supply power to each of the LEDs 17 mounted on the board body portion 18Ba.

Fourth Embodiment

Figure 12:
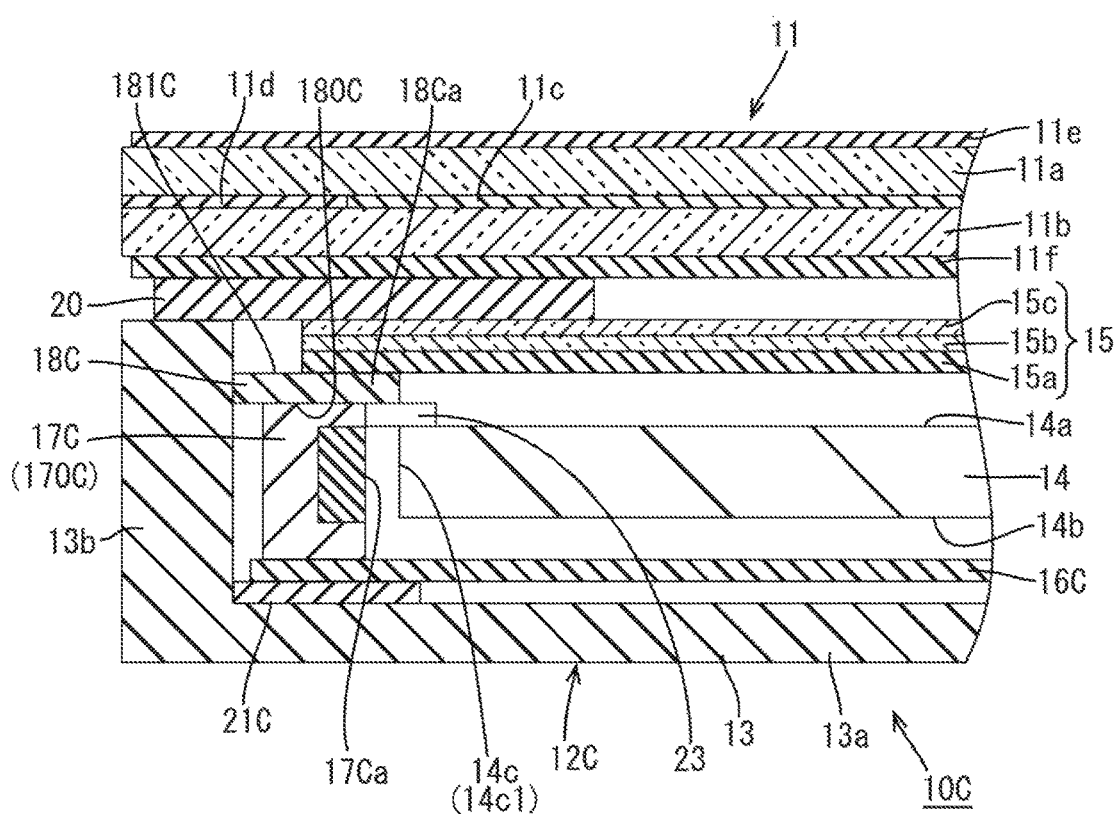
FIG. 12 is a cross-sectional view illustrating a part of a liquid crystal display device according to a fourth embodiment.
Figure 13:
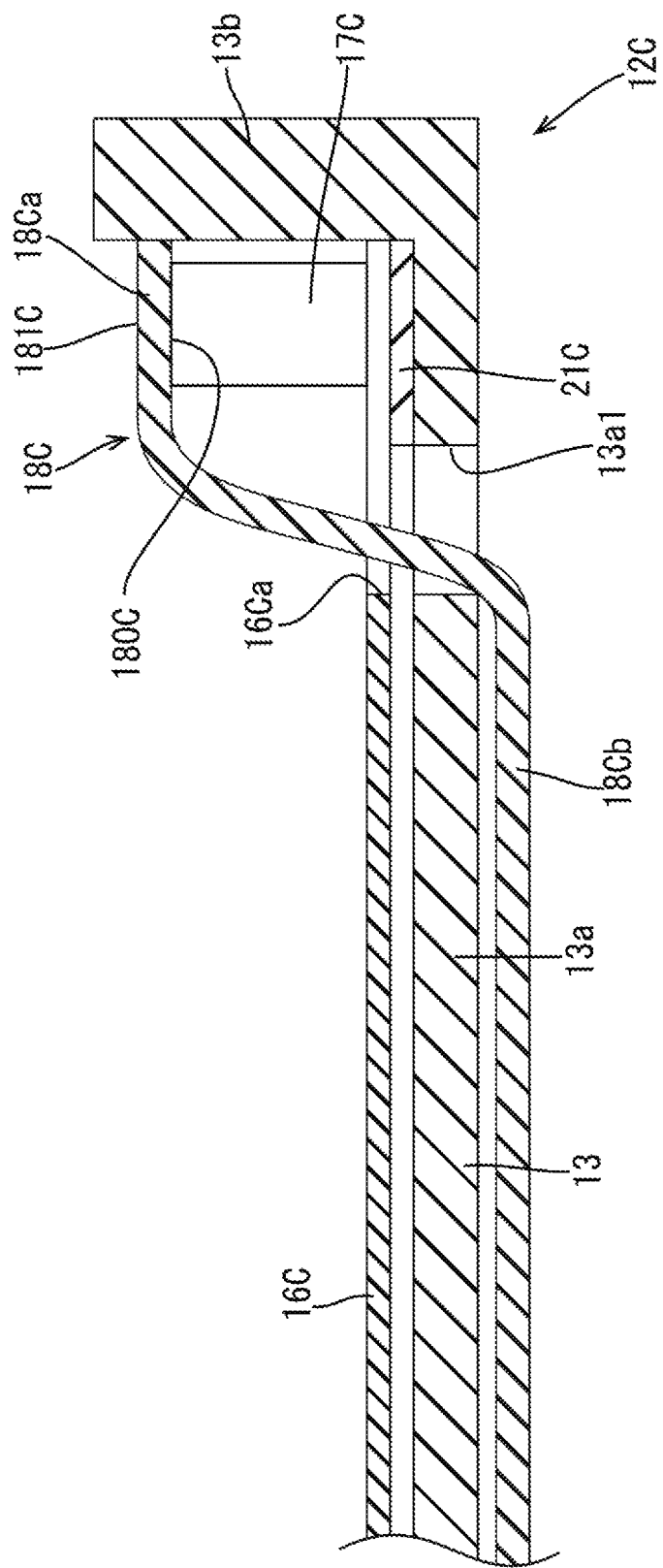
FIG. 13 is a cross-sectional view illustrating a part of a backlight device according to the fourth embodiment.

Next, a backlight device 12C and a liquid crystal display device 10C according to a fourth embodiment of the present invention will be described with reference to FIGS. 12 and 13. FIG. 12 is a cross-sectional view illustrating a part of the liquid crystal display device 10C of the fourth embodiment and FIG. 13 is a cross-sectional view illustrating a part of the backlight device 12C of the fourth embodiment.

In the backlight device 12C of the present embodiment, the LED board 18C is arranged on the front side of the light guide plate 14 such that a LED 17C mounting surface 180C of the LED board 18C faces the rear side (namely, the bottom portion 13a side of the chassis 13). The LED board 18C of the present embodiment has a configuration that is reversed with respect to the front and rear side of the LED board 18 of the first embodiment.

The LED board 18C includes a substantially annular board body portion 18Ca where LEDs 17C are mounted and an extended portion 18Cb having a belt-like shape and extending inwardly from an inner edge of the board body portion 18Ca.

The LEDs 17 are mounted on the board body portion 18Ca in an annular shape such that each of the LEDs 17 emits light toward a center. Namely, each of the LEDs 17C has a light emission surface 17Ca facing the center of the board body portion 18Ca (a center of an annular arranged light source group 170C).

The extended portion 18Cb extends from the inner edge of a portion of the board body portion 18Ca having no LED 17 and is not arranged in front of the LED 17C. The extended portion 18Cb extends down from the board body portion 18Ca toward the bottom portion 13Ca of the chassis 13.

In the present embodiment, a predetermined trace pattern (the trace portion) is formed in an area from the board body portion 18Ca to the extended portion 18Cb to supply power from the outside to each of the LEDs 17C mounted on the board body portion 18Ca.

Such a LED board 18C is fixed to the light guide plate 14 such that the LEDs 17C are arranged on the rear surface side thereof and the inner edge side portion of the mounting surface 180C of the board body portion 18C is opposite the front surface side outer edge portion of the light guide plate 14. A double-sided adhesive tape 23 is between the light guide plate 14 and the LED board 18C and the LED board 18C is fixed to the light guide plate 14 with using the double-sided adhesive tape 23. The LED 17C has an edge surface opposite the bottom portion 13a and the edge surface is contacted with the reflection sheet 16C.

The reflection sheet 16C is arranged to cover the front surface side of the bottom portion 13a within the chassis 13. A double-sided adhesive tape 21C is between a peripheral edge portion of the reflection sheet 16C and the bottom portion 13a and the reflection sheet 16C is fixed to the bottom portion 13a with using the double-sided adhesive tape 21C.

The reflection sheet 16C has a cutout portion 16Ca in the peripheral edge portion thereof. The exit hole 13a1 is formed through the bottom portion 13a of the chassis 13 and the exit hole 13a1 is exposed through the cutout portion 16Ca. As described before, the extended portion 18Cb extending from the board body portion 18Ca down toward the bottom portion 13a of the chassis 13 extends through the cutout portion 16Ca of the reflection sheet 16C and through the exit hole 13a1 of the bottom portion 13a to the outside the chassis 13. The basal portion of the extended portion 18Cb is in a space between the side wall portion 13b of the chassis 13 and the outer peripheral edge surface of the light guide plate 14.

The extended portion 18Cb extends from a portion of the board body portion 18Ca having no LED 17C (a portion between the adjacent LEDs 17C). Therefore, the extended portion 18Cb is less likely to block the light emitted by the LED 17C.

As is described in the present embodiment, the LED board 18C may be arranged on the front-surface side (the light exit portion 1a side) of the light guide plate 14 and the extended portion 18Cb may extend from the front-surface side toward the rear-surface side of the light guide plate 14 and pass through the exit hole 13a1 to the outside of the chassis 13.

The light guide plate 14 may have a recessed cutout portion at the edge portion thereof and provide a space between the outer peripheral edge surface of the light guide plate and the side wall portion such that the extended portion 18Cb is inserted easily.

Other Embodiments

The present invention is not limited to the embodiments described above with reference to the drawings and the following embodiments may be included in the technical filed of the present invention.

(1) In each of the above embodiments, the LED board (the light source board) is a flexible printed circuit board. However, it is not limited thereto but the board body portion may be a printed circuit board having rigidity and the extended portion may be a lead wire (a linear conductive member covered with an insulation layer). A flexible printed circuit board is preferable as the LED board (the light source board) in each of the embodiments.

(2) In the second embodiment, the trace pattern is formed on only the mounting portion of the board body portion. However, in another embodiment, a part of the trace pattern may be formed on the cover portion.

(3) In each of the above embodiments, a reflection layer made of light reflective coating may be suitably disposed on the mounting surface of the board body portion and a surface of the extended portion. For example, in the second embodiment, a reflection layer may be formed to cover surfaces of the mounting portion and the cover portion. With such a configuration, light leaking through the rear surface of the light guide plate may be returned into the light guide plate quite effectively.

(4) In the second embodiment, a double-sided adhesive tape may be between the cover portion and the bottom portion.

Figure 14:
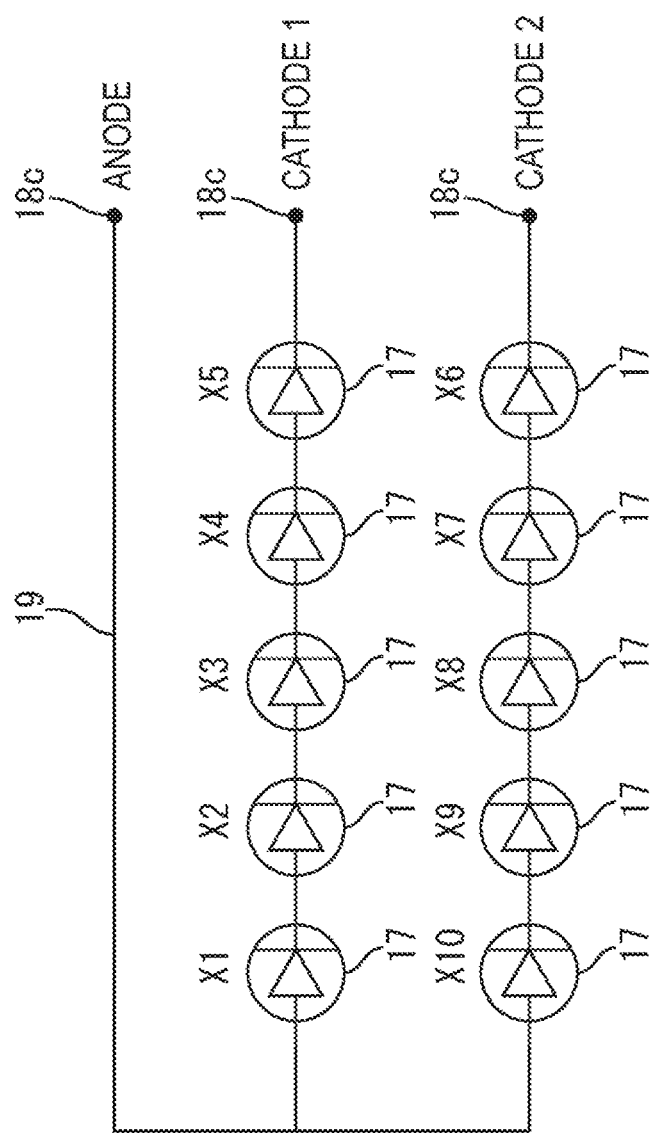
FIG. 14 is a typical circuit diagram of a LED board.
Figure 15:
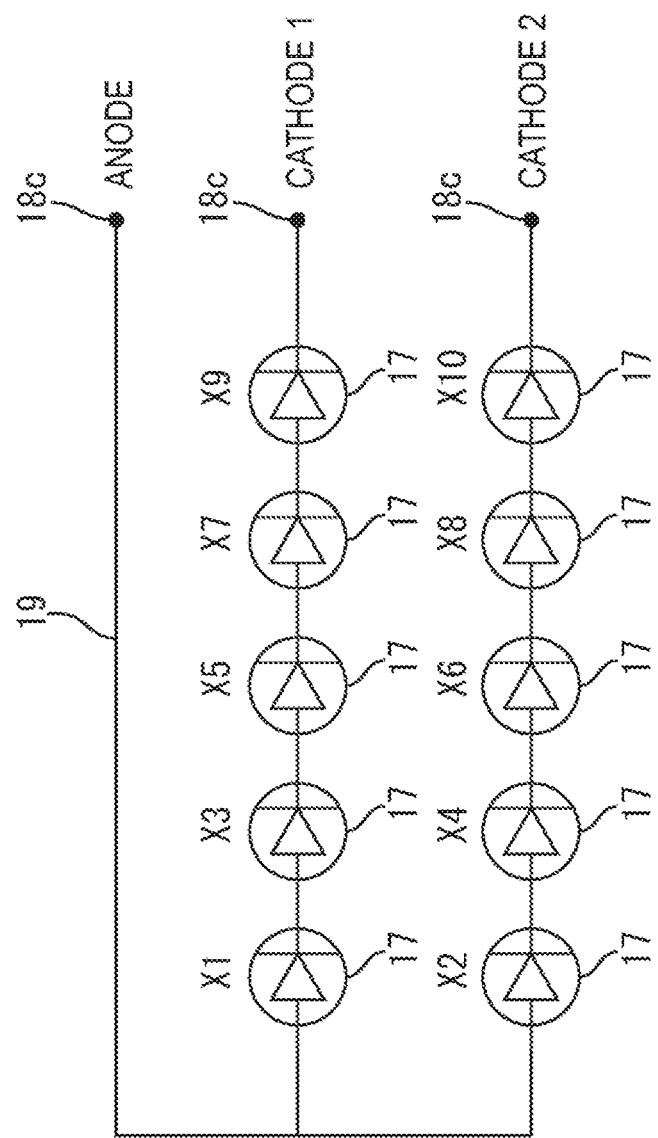
FIG. 15 is a typical circuit diagram of a LED board.

(5) In each of the above embodiments, the LEDs and the trace pattern are disposed to have a configuration of a circuit diagram of FIG. 4. However, it is not limited thereto. For example, the LEDs and the trace pattern may be disposed on the LED board to have a configuration of each of the circuit diagrams illustrated in FIGS. 14 and 15. X1 to X10 illustrated in FIGS. 14 and 15 correspond to the respective positions X1 to X10 of the LEDs 17 in FIG. 3.

(6) In each of the above embodiments, the LED is used as the light source. An organic EL may be used as the light source.

(7) In each of the above embodiments, the transmissive type liquid crystal display device is used. However, the present invention may include a liquid crystal display device of a semi-transmissive type.

(8) In each of the above embodiments, the TFTs are used as the switching components of the liquid crystal panel. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(9) In each of the above embodiments, the liquid crystal panel of the FFS mode is used. However, it is not limited thereto. A liquid crystal panel of other mode such as an in-plane switching (IPS) mode may be used in other embodiment.

(10) In each of the above embodiments, the liquid crystal display device includes the liquid crystal panel as the display panel. However, a display panel of micro electro mechanical systems (MEMS) that displays images with using light from a backlight device may be used. In the MEMES display panel, micro mechanical shutters as display pixels are planarly arranged in a matrix and each of the mechanical shutters is controlled to be open or closed to adjust the amount of transmission light from the backlight device for every display pixel. Thus, an image of a certain gradation is displayed.

EXPLANATION OF SYMBOLS

10: liquid crystal display device (display device), 11: liquid crystal panel (display panel), 12: backlight device (lighting device), 13: chassis (casing), 13a: bottom portion, 13a1: exit hole, 13b: side wall portion, 14: light guide plate, 14a: light exit portion, 14b: rear surface, 14c: outer peripheral edge surface, 14c1: light entrance portion, 15: optical sheet, 16: reflection sheet, 17: LED (light source), 17a: light emission surface, 170: annular arranged light source group, 18: LED board (light source board), 18a: board body portion, 18b: extended portion, 18c: terminal portions, 19: trace pattern (trace portion)

The invention claimed is:

1. A lighting device comprising:
light sources;
a light source board including
a board body portion having a substantially circular outer edge and on which the light sources are arranged at intervals in a substantially annular shape such that each of the light sources emits light toward a center,
an extended portion extending inward from the board body portion, and
a trace portion electrically connected to each of the light sources for supplying power to each of the light sources and disposed in an area from the board body portion to the extended portion such that an end of the trace portion is arranged at a distal end of the extended portion; and
a casing including
a side wall portion having a tubular shape and surrounding the light sources that are arranged in the substantially annular shape, and
a bottom portion disposed on one end of the side wall portion to be opposite the board body portion and having an exit hole therethrough through which the extended portion is inserted and the distal end of the extended portion is outside,
wherein the board body portion includes a mounting portion having a substantially annular shape and a cover portion covering inside of the mounting portion,
wherein the cover portion has a hole surrounding a periphery of the extended portion so as not to be in contact with the extended portion.

2. The lighting device according to claim 1, wherein the board body portion and the extended portion are formed integrally with each other.

3. The lighting device according to claim 1, wherein the light source board is a flexible printed circuit board.

4. The lighting device according to claim 1 wherein the extended portion extends from a portion of the board body portion between adjacent light sources and having no light source thereon.

5. The lighting device according to claim 1, wherein the board body portion has a mounting surface on which the light sources are arranged and an opposite surface that is opposite of the mounting surface, and the opposite surface is opposite the bottom portion.

6. The lighting device according to claim 1, wherein
the board body portion has a mounting surface on which the light sources are arranged and an opposite surface that is opposite of the mounting surface, and the opposite surface is opposite the bottom portion, and
the lighting device further comprising a reflection sheet disposed on a mounting surface side of the board body portion to cover the mounting portion and the cover portion.

7. The lighting device according to claim 1, further comprising a light guide plate having a substantially circular plan view shape and arranged inside the light sources that are arranged in the substantially annular shape.

8. A display device comprising:
   the lighting device according to claim 1; and
   a display panel.

* * * * *